Patented June 22, 1954

2,681,917

UNITED STATES PATENT OFFICE 2,681,917

COMPOUNDS WITH TWO FURANIC CYCLES

Louis Léon Joseph Fauqué, Premery, France, assignor to Etablissements Lambiotte Freres, Premery, France, a corporation of France No Drawing. Application March 19, 1948, Serial No. 15,977

Claims priority, application France April 14, 1947

5 Claims. (Cl. 260—346.1)

The present invention relates to chemical compounds comprising two furanic cycles and to a method for obtaining such compounds.

Compounds comprising two furanic cycles separated by a single carbonated link are usually obtained by reduction of the corresponding ketones by means of ethanol and sodium, that is to say by starting from compounds having the same skeleton.

The difurylmethane may thus be obtained from difuryl ketone. Such a process, owing to the difficulty of procuring the necessary ketones, may hardly be anything else than a laboratory process.

Other methods have also been proposed for the production of similar compounds, for instance, for the obtention of difuryl-methylmethane by the action of acetaldehyde on ethyl fuorate (ethylic ester of pyromucic acid), saponification of the obtained compound, followed by a distillation on copper powder generally leading to a mixture containing difuryl-methylmethane. The sequence of the operations which are necessary to carry out this method makes its realization intricate and barely qualified to be brought to an industrial scale.

The object of the present invention is to provide new compounds comprising two furanic cycles, which have not yet been mentioned in the literature and which are of a great interest owing to their aromatic properties, viz. the compounds of the series of the di(methyl-furyl)-methane.

According to the invention, these compounds may be obtained by causing methyl-2-furan to act upon an aldehyde of the aliphatic, aromatic or heterocyclic series or upon a ketone of the aliphatic series, in the presence of a mineral acid such as sulphuric, hydrochloric or phosphoric acid, the reacting substances being, preferably, stirred and/or heated together, contingently at boiling temperature. The surprising fact has been noticed that, under the above mentioned conditions, two molecules of methyl-2-furan condense with one molecule of aldehyde or ketone, under elimination of one molecule of water, according to a reaction of the following type:

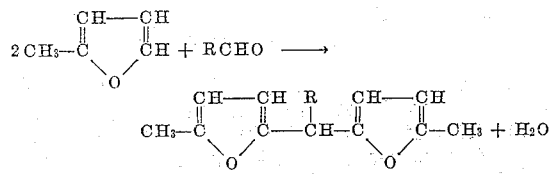

The amount of mineral acid to employ as a catalyst is advantageously of the order of 1 to 2% with respect to the total amount of the reacting substances, but it is possible to deviate from these limits in one direction or another taking into account the fact that the yield of the reaction increases quickly, at first, with the proportion of mineral acid used, this increase being afterwards much less rapid. It is thus necessary to ascertain by experience the best concentration of the acid for each particular case, in relation with the operating conditions and in order to obtain the best economic conditions.

In the case of aldehydes which polymerize easily in the presence of mineral acids, for instance acetic aldehyde which passes to paraldehyde, it is desirable not to increase too much the amount of acid, which would lead to a violent overheating of the mixture with subsequent polymerization of the aldehyde.

On the other hand, the quality of the mineral acid employed may affect the proportion of said acid which could be used, and this proportion should be, to obtain a same yield, all the more stronger as the acid is weaker, for instance, two to three times higher for phosphoric acid than for hydrochloric acid.

The temperature increase and the stirring also help the reaction. The facility of the latter decreases when passing from the aldehydes of the aliphatic series to the aldehydes of the aromatic and heterocyclic series, and it decreases still more when passing to the ketones of the aliphatic series. Thus, except for the first terms of the aldehydes of the aliphatic series, aside from formaldehyde, it is necessary, in order to obtain a proper yield, to stir the reacting mixture and, for the aldehydes of the aromatic and heterocyclic series, as well as for the ketones, to heat it, preferably up to boiling point, which simultaneously secures the stirring. In the particular case of formaldehyde, generally used under the form of an aqueous solution or of trioxymethylene, it is necessary to heat and to stir rapidly the heterogeneous mixture to facilitate the contact. It is possible, however, to carry out the reaction by stirring only, provided that the proportion of mineral acid used is increased; proportions of the order of 20% lead to satisfactory yields.

To carry out the above-mentioned method, the proportions of the substances partaking to the reaction may be those which correspond to the above formula, that is to say, two molecules of methyl-2-furan for one molecule of aldehyde or ketone. In order to increase the yield, it is generally advantageous to use an excess of aldehyde or ketone. However, in the particular case of formaldehyde, it is best, on the contrary, to use methyl-2-furan in excess, in order to avoid the formation of viscous compounds which would result from the action of the excess of formaldehyde upon the already formed di-(methyl-furyl)-methane.

The mixture of methyl-2-furan and aldehyde or ketone, to which mineral acid has been added is, depending on the case, and according to what has been disclosed above, left to rest or stirred at ambient temperature or still brought to ebullition under a reflux condenser, with or without stirring, during a time which may vary from one to about 24 hours, the stirring process accelerating the reaction in all cases. After this treatment, the mixture, brought back to ordinary temperature, is neutralized and washed, for instance with a 5% solution of carbonate of soda, then with water, and, last of all, distilled.

The reaction may also be carried out in vapour phase by causing a mixture of vapours of methyl-2-furan and of aldehyde or ketone to pass upon a contacting substance, for instance pumice imbibed with acid, phosphoric acid for instance, and brought to about 250° C.

When the above-mentioned proportions have been observed, the distillate obtained after elimination of methyl-2-furan, passes at constant temperature, the residuum of the distillation being so small that it can be disregarded.

The well defined products obtained according to the invention, which correspond to the general formula:

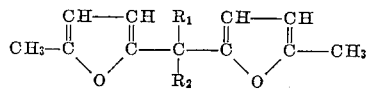

—in which, either $R_1$ and $R_2$ each represent an atom of hydrogen, or $R_1$ represents an atom of hydrogen and $R_2$ an alkyl, aryl or heterocyclic radical, or $R_1$ and $R_2$ each represent an alkyl, aryl or heterocyclic radical—are colourless liquids of a density slightly higher than one, insoluble in water and soluble in the usual organic solvents. They have characteristic odours, generally rather marked, which make them very interesting products for the perfumery industry.

*Example 1.—Preparation of di-(methyl-furyl) methane $C_5H_5O$—$CH_2$—$C_5H_5O$ by condensation of methyl-2-furan and formaldehyde*

3 ccm. of phosphoric acid are added to vigorously stirred a mixture of 164 g. of methyl-2-furan (2 mol.) distilling at 63–63.5° C. under atmospheric pressure, and of 100 g. of a 30% solution of formaldehyde. The whole mixture is brought to slight ebullition, while stirring, during one hour, then left to rest. The oily layer which collects on the surface is decanted, washed with a 5% solution of carbonate of soda, then with water, and finally distilled, at first under pressure to recover the sylvane which has not reacted, then under vacuum. 70 g. of di-(methyl-furyl)-methane, distilling at 75° C. under 3 mm. Hg are thus obtained.

This product appears under the form of a colourless liquid, of a density slightly higher than one, insoluble in water, soluble in the usual organic solvents, and possesses a very distinct and powerful smell of anise, as well as an anisated taste.

Boiling points: $Eb_{11}$, 107–108° C.; $Eb_3$, 75° C.; $Eb_1$, 59–60° C.

*Example 2.—Preparation of di-(methyl-furyl)-methyl-methane $C_5H_5O$—$CH$—$CH_3$—$C_5H_5O$, by condensation of methyl-2-furan and acetaldehyde*

A mixture of 164 g. of methyl-2-furan and 88 g. of acetaldehyde to which has been added 1 ccm. of concentrated hydrochloric acid is stirred during two hours at ambient temperature. The water formed is decanted and the oily layer obtained is distilled under ordinary pressure to recover the acetaldehyde and the sylvane which have not reacted. The residuum is washed with a 5% solution of carbonate of soda, then with water and, finally, distilled under vacuum. 90 to 95 gr. of di(methyl-furyl)-methyl-methane are obtained, said compound appearing under the form of a colourless liquid, of a density of 1,026 at 15° C., insoluble in water, soluble in the usual organic solvents and which possesses chiefly a smell of lemon, with a flowered note.

Boiling points: $Eb_{11}$, 106–107° C.; $Eb_{3,5}$, 72–73° C.

*Example 3.—Preparation of di(methyl-furyl)-furyl-methane $C_5H_5O$—$CH$—$C_5H_5O$—$C_5H_5O$, by condensation of methyl-2-furan with furfurol*

A mixture of 123 gr. of methyl-2-furan and of 48 gr. of furfurol, to which has been added 1 ccm. of phosphoric acid, is stirred, during one hour, at ebullition. After a rest and decantation of the water, the oil is treated as in Example 2.

30 gr. of di-(methyl-furyl)-furyl-methane are thus obtained, distilling at 123–125° C., under 4 mm. Hg. which appears under the form of a colourless liquid, of density higher than one, with a very weak flowered smell.

*Example 4.—Preparation of di(methyl-furyl)-phenyl-methane $C_5H_5O$—$CH$—$C_6H_5$—$C_5H_5O$, by condensation of methyl-2-furan with benzoic aldehyde*

A mixture of 82 gr. of methyl-2-furan and 26.5 gr. of benzaldehyde to which has been added 1 ccm. of concentrated hydrochloric acid, is stirred at ebullition during one hour. After a rest and decantation of the water, the oil is treated as in Example 2.

15 gr. of di-(methyl-furyl)-phenyl-methane are thus obtained, distilling at 144–147° C. under 2 mm. Hg, and appearing under the form of an oil of a density higher than one, nearly scentless.

*Example 5.—Preparation of di(methyl-furyl)-di(methyl)-methane*

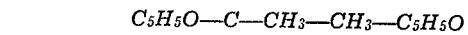

*by condensation of methyl-2-furan with acetone*

A mixture of 164 gr. of methyl-2-furan and 58 gr. of acetone, to which have been added 2 cm.³ of phosphoric acid, is brought to ebullition, during three hours, under a reflux condenser. The oil obtained, treated as in Example 2, yields 25 to 27 gr. of di(methyl-furyl)-di(methyl)-methane, a colourless liquid, distilling at 120° C. under 12 mm. Hg, with a smell approaching that of di(methyl-furyl)-methyl-methane, but more sweetish.

In the preceding examples, the yield indicated output refers to an isolated operation, but the real industrial yield, taking into account the possibility of recovery of the biggest part of the employed products, is much higher, and attains values of the order of 80 to 90%.

What I claim is:

1. A method for the preparation of condensation compounds having olfactive and gustatory properties and corresponding to the following structural general formula:

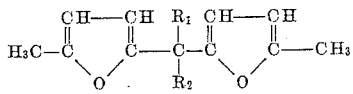

in which $R_1$ and $R_2$ are monovalent substituent members of the group consisting of hydrogen, lower alkyl, furfuryl and phenyl radicals, consisting in forming a mixture of substantially two moles of methyl-2-furan and of one mole of a reaction component member of the group consisting of aldehydes and ketones carrying at least one of the above monovalent substituents, in causing said mixture to react under acid conditions, at a temperature between about 20° C. and 250° C. and separating the condensation compound thus formed.

2. A method for the preparation of condensation compounds having olfactive and gustatory properties and corresponding to the following structural general formula:

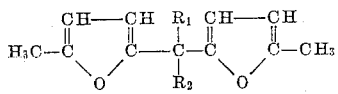

in which $R_1$ and $R_2$ are monovalent substituent members of the group consisting of hydrogen, lower alkyl, furfuryl and phenyl radicals, consisting in forming a mixture of substantially two moles of methyl-2-furan and of one mole of a reaction component member of the group consisting of aldehydes and ketones carrying at least one of the above monovalent substituents, in causing said mixture to react in liquid phase containing a mineral acid, while stirring, at a temperature between about 20° C. and the boiling temperature of the mixture and separating the condensation compound thus formed.

3. A method as set forth in claim 2 in which the liquid reaction mixture is acidified with a quantity of mineral acid less than 3% with respect of the total amount of the reaction components.

4. A method as set forth in claim 2, in which the reaction component condensing with methyl-2-furan is formol.

5. A method as set forth in claim 2, in which the reaction component condensing with methyl-2-furan is acetaldehyde.

References Cited in the file of this patent

UNITED STATES PATENTS

| Number | Name | Date |
|---|---|---|
| 2,306,924 | Zerweck | Dec. 29, 1942 |
| 2,450,108 | Bremner | Sept. 28, 1948 |
| 2,486,392 | Dunlop | Nov. 1, 1949 |

OTHER REFERENCES

Alder, Berichte de deut chem. Ges., vol. 76B, pp. 183–205 (1943).

Gillman et al., Chem. Reviews, August–December 1932, p. 345.

Dinelli et al., Annali Di Chimica Applicata, vol. 26 (1936) p. 325.

Gillman et al., J. Am. Chem. Soc. 55, 3307 (1933).

Dinelli, Gazzeta Chimica Italiana, vol. 67, 1937, pp. 312–317.